US012553598B2

(12) United States Patent
Cai

(10) Patent No.: US 12,553,598 B2
(45) Date of Patent: Feb. 17, 2026

(54) LIGHT FIXTURE INCLUDING HEAT SINK FOR SUPPORTING LIGHTING MODULE

(71) Applicant: HGCI, Inc., Marysville, OH (US)

(72) Inventor: Dengke Cai, Camas, WA (US)

(73) Assignee: HGCI LLC, Las Vegas, NV (US)

( * ) Notice: Subject to any disclaimer, the term of this patent is extended or adjusted under 35 U.S.C. 154(b) by 0 days.

(21) Appl. No.: 18/723,416

(22) PCT Filed: Jan. 9, 2023

(86) PCT No.: PCT/US2023/010408

§ 371 (c)(1),
(2) Date: Jun. 22, 2024

(87) PCT Pub. No.: WO2023/133318

PCT Pub. Date: Jul. 13, 2023

(65) Prior Publication Data

US 2025/0164100 A1 May 22, 2025

Related U.S. Application Data

(60) Provisional application No. 63/297,713, filed on Jan. 8, 2022.

(51) Int. Cl.
*F21V 29/00* (2015.01)
*F21V 29/10* (2015.01)
*F21V 29/74* (2015.01)

(52) U.S. Cl.
CPC .............. *F21V 29/10* (2015.01); *F21V 29/74* (2015.01)

(58) Field of Classification Search
CPC ................................ F21V 29/10; F21V 29/74
See application file for complete search history.

(56) References Cited

U.S. PATENT DOCUMENTS

| | | | | |
|---|---|---|---|---|
| 2009/0145581 | A1* | 6/2009 | Hoffman | F28F 3/14 165/80.3 |
| 2011/0050070 | A1* | 3/2011 | Pickard | F21V 29/51 313/46 |
| 2011/0079370 | A1* | 4/2011 | Wen | H01L 23/367 165/80.3 |
| 2020/0049418 | A1* | 2/2020 | Chu | F28D 15/0275 |
| 2020/0158323 | A1* | 5/2020 | Das | F21V 29/71 |
| 2021/0251104 | A1* | 8/2021 | Mitsunari | G06F 1/20 |

OTHER PUBLICATIONS

Thomas, Shane; International Search Report and Written Opinion of the International Searching Authority; Int'l. App. No. PCT/US2023/010408; Jun. 15, 2023; 11 pages.

* cited by examiner

*Primary Examiner* — Gerald J Sufleta, II
(74) *Attorney, Agent, or Firm* — Frost Brown Todd LLP

(57) ABSTRACT

A light fixture includes a lighting module and a heat sink. The lighting module includes a plurality of light emitting diodes and a heat sink. The light emitting diodes are configured to project light onto an area beneath the light fixture. The heat sink overlies the lighting module and is configured to dissipate heat away from the lighting module. The heat sink includes a base plate, a first base fin and a second base fin. The first base fin extends upwardly from the base plate. The second base fin extends upwardly from the base plate and is spaced from the first base fin.

19 Claims, 8 Drawing Sheets

LIGHT FIXTURE INCLUDING HEAT SINK FOR SUPPORTING LIGHTING MODULE

REFERENCE TO RELATED APPLICATION

This application claims priority of U.S. provisional patent application Ser. No. 63/297,713, entitled Light Fixture Including Heat Sink for Supporting Lighting Module, filed Jan. 8, 2022, and hereby incorporates this provisional patent application by reference herein in its entirety.

TECHNICAL FIELD

The apparatus described below generally relates to a light fixture that includes a heat sink. An array of light sources are supported beneath the heat sink and facilitate illumination of an area beneath the light fixture.

BACKGROUND

Indoor grow facilities, such as greenhouses, include light fixtures that provide artificial lighting to plants for encouraging growth. Each of these light fixtures typically includes a plurality of LEDs that generate the artificial light for the plants.

BRIEF DESCRIPTION OF THE DRAWINGS

Various embodiments will become better understood with regard to the following description, appended claims and accompanying drawings wherein:

DETAILED DESCRIPTION

Figure 1:
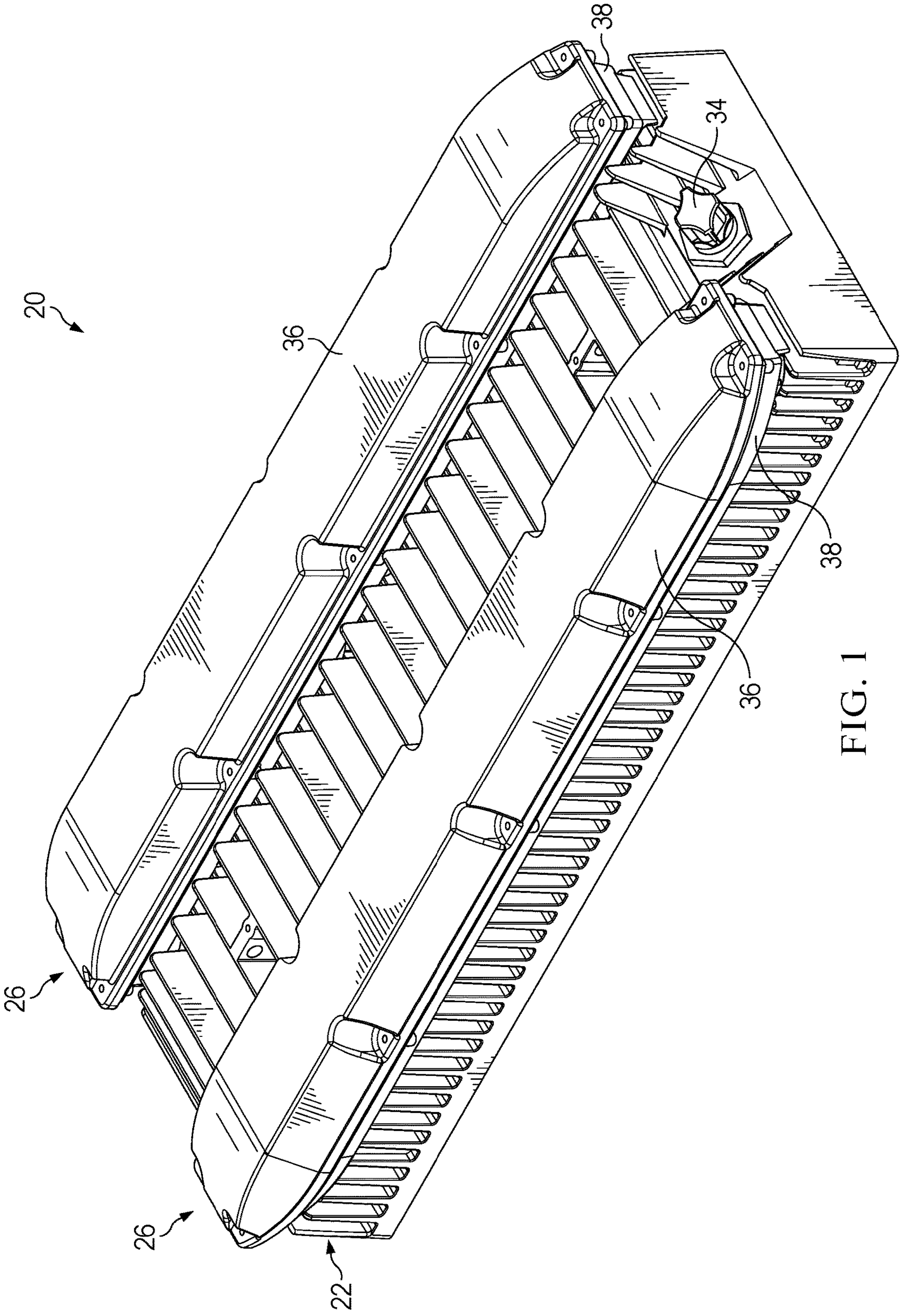
FIG. 1 is a front upper isometric view depicting a light fixture.
Figure 2:
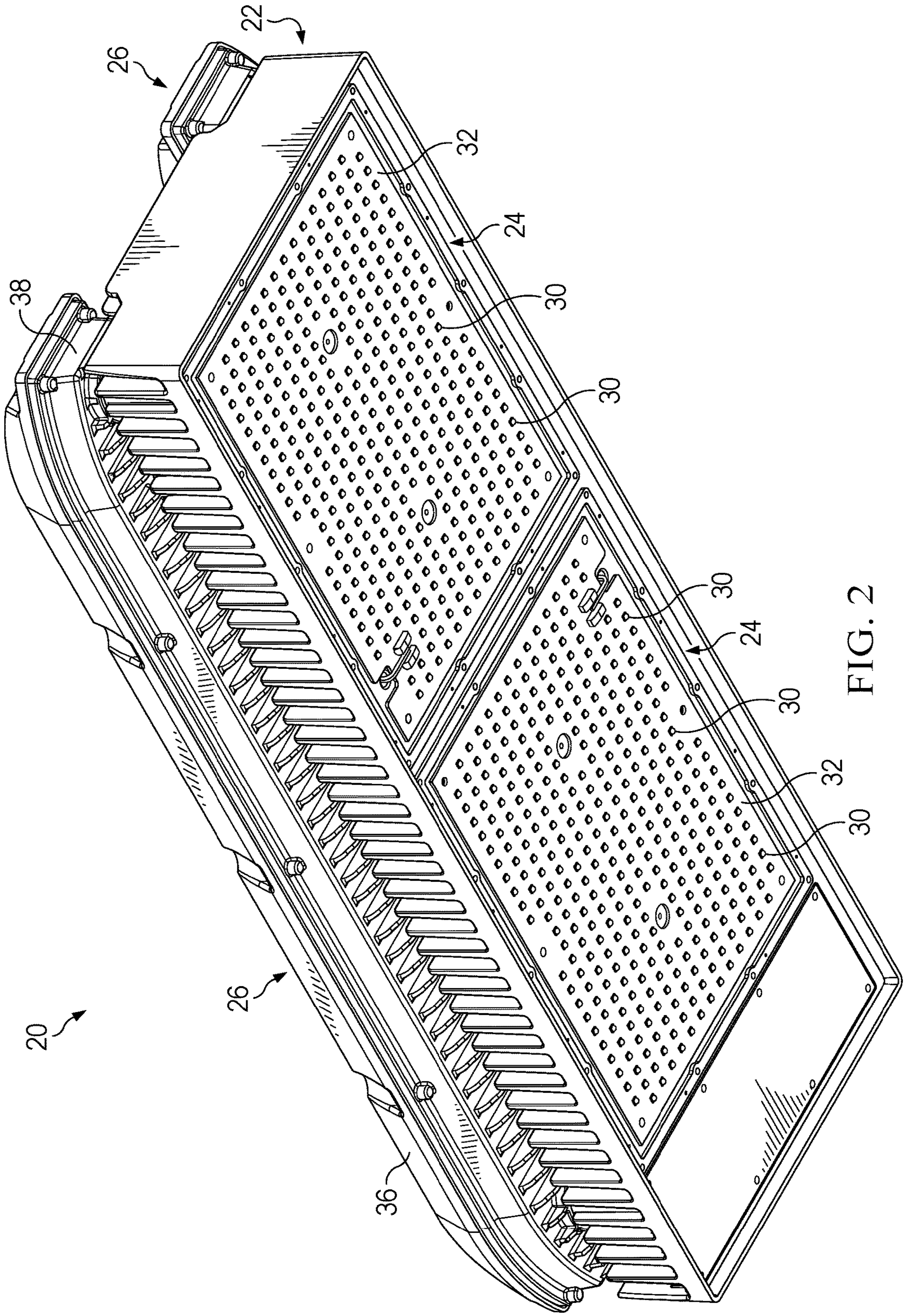
FIG. 2 is a rear lower isometric view of the light fixture of FIG. 1.
Figure 3:
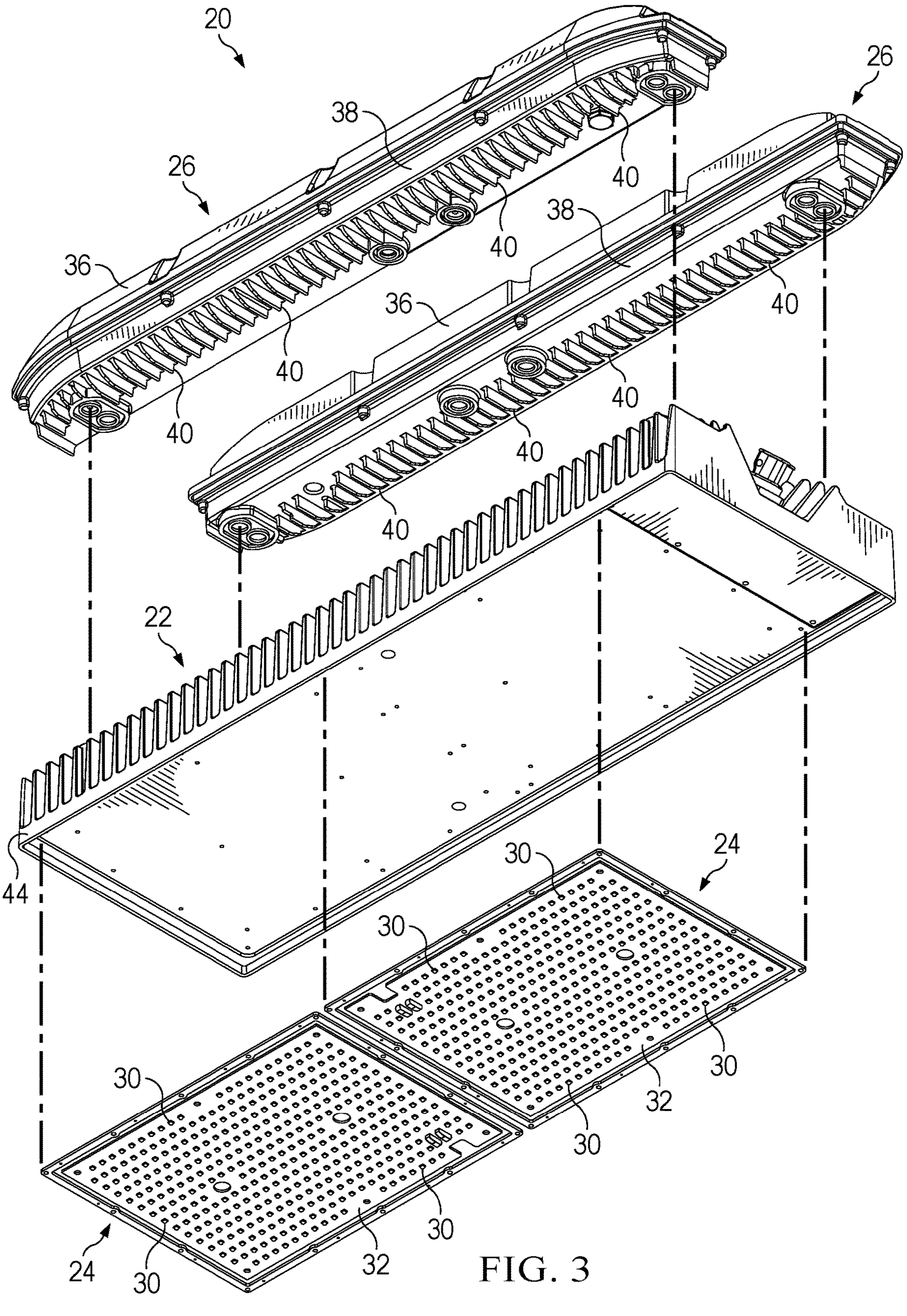
FIG. 3 is an exploded view of the light fixture of FIG. 1.

Embodiments are hereinafter described in detail in connection with the views and examples of FIGS. 1-8, wherein like numbers indicate the same or corresponding elements throughout the views. A light fixture 20 for an indoor grow facility (e.g., a greenhouse) is generally depicted in FIGS. 1-3 and can include a heat sink 22, a pair of lighting modules 24, and a pair of driver housings 26. As illustrated in FIGS. 2 and 3, the lighting modules 24 can be disposed beneath the heat sink 22 and coupled to a lower surface 28 of the heat sink 22 (e.g., with fasteners (not shown)). As illustrated in FIGS. 1-3, the driver housings 26 can be disposed above the heat sink 22 and coupled thereto (e.g., with fasteners (not shown)) such that the heat sink 22 provides underlying support for the driver housings 26. The driver housings 26 can be horizontally spaced from each other and vertically spaced from the lighting modules 24. It is to be appreciated that the lighting modules 24 and/or the driver housings 26 can be coupled to the heat sink 22 via any of a variety of suitable alternative releasable arrangements (e.g., with clips) or rigid arrangements (e.g., adhesive or welding).

The lighting modules 24 can be configured to generate light, such that, when the light fixture 20 is suspended above one or more plants (not shown), the light generated by the lighting modules 24 can be delivered to underlying plant(s) to stimulate growth. As illustrated in FIG. 1, the lighting modules 24 can include a plurality of light emitting diodes 30 (LEDs) that are mounted on a submount 32. The LEDs 30 can comprise surface mount LEDs that are mounted to the submount 32 via any of a variety of methods or techniques commonly known in the art. The LEDs 30 can be provided in any of a variety of suitable configurations that are mounted directly or indirectly to the submount 32. The LEDs 30 can comprise single color LEDs (e.g., capable of emitting only one color of light such as white, red or blue), multi-color LEDs (e.g., capable of emitting different colors such as white, red, and blue) or a combination of both. The submount 32 can be formed of any of a variety of thermally conductive materials that are suitable for physically and thermally supporting the LEDs 30.

The heat sink 22 can be thermally coupled with the lighting modules 24 and configured to dissipate heat away from the lighting modules 24. The heat sink 22 can be formed of any of a variety of a thermally conductive materials, such as aluminum or copper, for example. The submounts 32 can be coupled to the heat sink 22 with the side opposite the LEDs 30 facing the heat sink 22 such that heat generated by the LEDs 30 can be transferred from the submounts 32 to the heat sink 22 and dissipated from the heat sink 22 to the surrounding environment to facilitate cooling thereof. In one embodiment, a heat sink compound (not shown), such as thermal paste, for example, can be provided between the submounts 32 and the heat sink 22 to enhance the thermal conductivity therebetween. Although the heat sink 22 is shown to be a unitary component that is provided over the lighting modules 24, it is to be appreciated that dedicated heat sinks can alternatively be provided over each of the lighting modules 24.

Each driver housing 26 can house a controller and a driver (not shown) that are configured to independently control and power one of the lighting modules 24. In one embodiment, each controller and driver combination can cooperate to control the illumination characteristics (e.g., dimming) of one of the lighting modules 24. The controllers and the drivers can be electrically coupled with an input port 34 that facilitates delivery of power and a communication signal to the light fixture 20 (via a cable). The power can originate from an external power source (not shown), such as an A/C power source, that facilitates powering of the light fixture 20. In one embodiment, the light fixture 20 can be configured to operate at an input power of between about 85 VAC and about 347 VAC (e.g., a 750 Watt load capacity). The communication signal can originate from a control source (not shown), such as a greenhouse controller, for example, that delivers a control signal to the light fixture 20 for controlling the lighting modules 24. The light fixture 20 can be configured to communicate according to any of a variety of suitable signal protocols, such as BACnet, ModBus, or RS485, for example.

One of the driver housings 26 will now be described but can be understood to be representative of both of the driver housings 26. The driver housing 26 can include a lid 36 and a base 38. The base 38 can be coupled with the heat sink 22 (e.g., with fasteners) to facilitate coupling of the driver housing 26 to the heat sink 22. The controller and driver can be coupled with the lid 36 (e.g., with fasteners). The lid 36 can overlie the base 38 and can be releasably coupled thereto to allow for selective access to the controller and driver retained on the lid. In one embodiment, the lid 36 and the base 38 can be releasably coupled together with fasteners (not shown). The driver housing 26 can be formed of any of a variety of thermally conductive materials, such as aluminum or copper, for example. Each controller and driver combination can be thermally coupled with the base 38 such that the driver housing 26 serves as a heat sink for the controller and the driver. As such, heat generated by the controller and driver can be transferred to the driver housing 26 and dissipated therefrom to the surrounding environment to facilitate cooling thereof. As illustrated in FIG. 3, the base 38 can include a plurality of lower fins 40 that extend downwardly towards the heat sink 22. The plurality of lower fins 40 can enhance the dissipation of heat from the controller and the driver via the driver housing 26.

Figure 4:
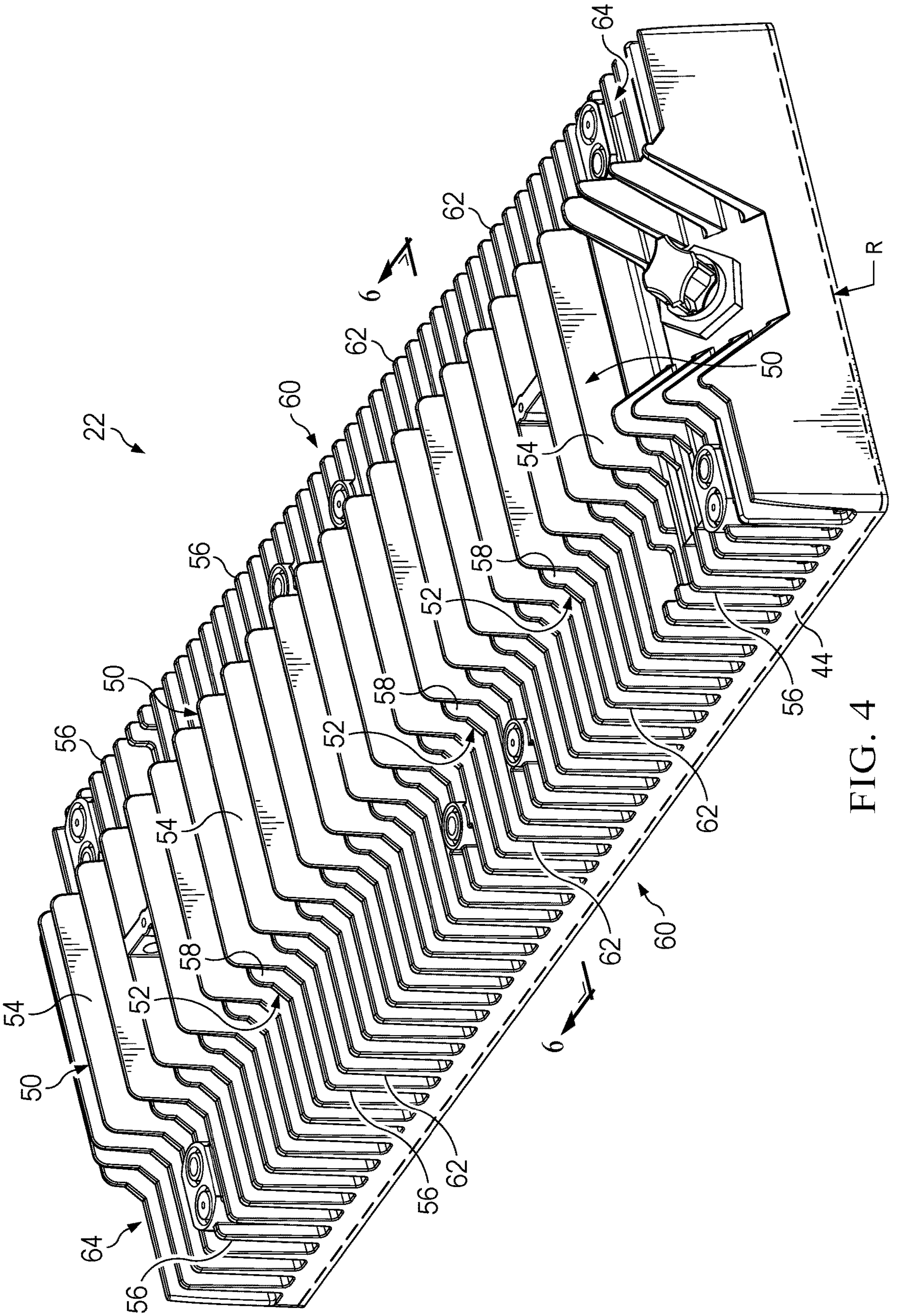
FIG. 4 is a front upper isometric view of a heat sink of the light fixture of FIG. 1.

Referring now to FIG. 4, the heat sink 22 can include a base plate 44 and a plurality of first base fins 50 and second base fins 52 that extend upwardly from the base plate 44 (e.g., towards the driver housings 26). Each of the second base fins 52 can be disposed laterally between immediately adjacent ones of the first base fins 50 such that the first and second base fins 50, 52 alternate along the length of the heat sink 22. In one embodiment, the heat sink 22 can be formed of a unitary one-piece construction such as, for example, through a molding (e.g., casting) or an extrusion process. The first base fins 50 can include a central portion 54 and a pair of outer portions 56 that extend laterally from the central portion 54 and to opposing sides 60 of the heat sink 22. The second base fins 52 can include a central portion 58 and a pair of outer portions 62 that extend laterally from the central portion 58 and to the opposing sides 60 of the heat sink 22. The outer portions 56 of each first base fin 50 can be shorter than the corresponding central portion 54 and the outer portions 62 of the second base fins 52 can be shorter than the corresponding central portion 58. The outer portions 56, 62 can be substantially the same height and can cooperate to define a pair of contoured grooves 64 on opposite sides of the heat sink 22 that accommodate the driver housings 26.

Figure 5:
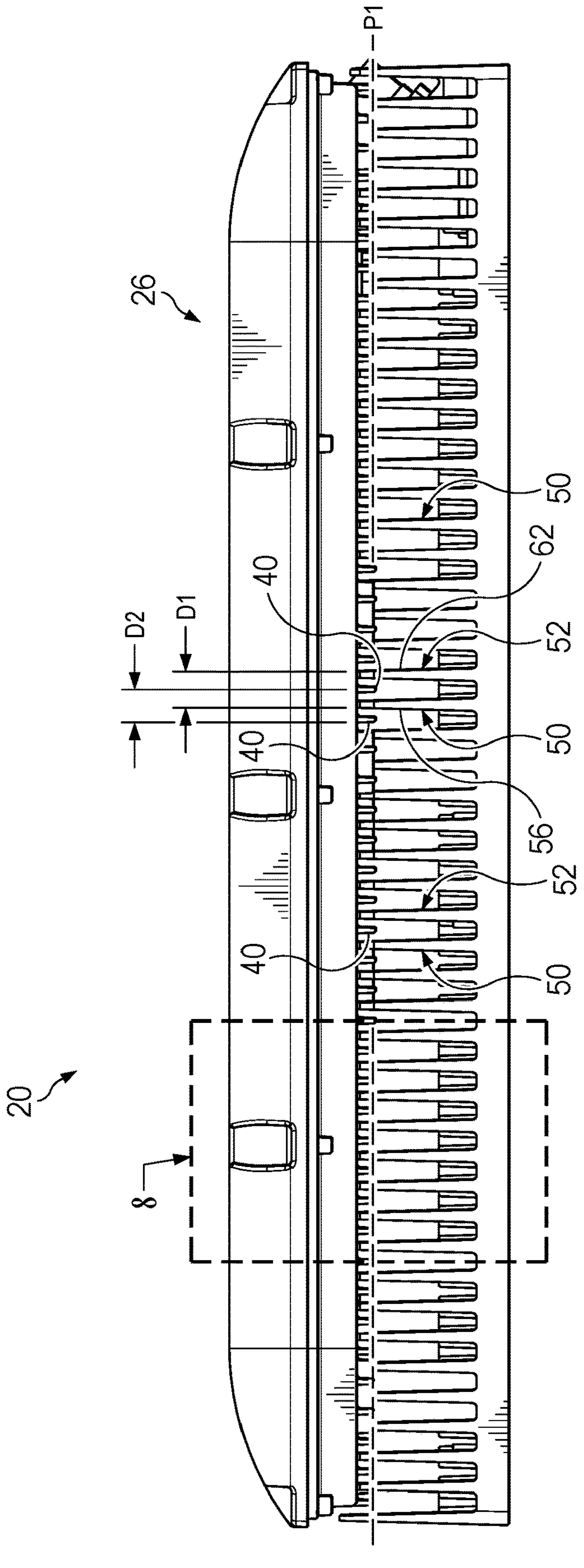
FIG. 5 is a side elevation view of the light fixture of FIG. 1.

Referring now to FIG. 5, each of the first and second base fins 50, 52 can be laterally spaced from each other by a distance D1 and each of the lower fins 40 of the driver housing 26 can be laterally spaced from each other by a distance D2. The distances D1 and D2 can be substantially the same. The lower fins 40 can be offset from the outer portions 56, 62 of the first and second base fins 50, 52 and can extend between the outer portions 56, 62. Each lower fin 40 can extend beyond adjacent ones of the outer portions 56, 62 such that an imaginary plane P1 that extends though the outer portions 56, 62 also intersects the lower fins 40. Each lower fin 40 can be substantially equidistant from adjacent ones of the outer portions 56, 62 of the first and second base fins 50, 52, respectively.

Figure 6:
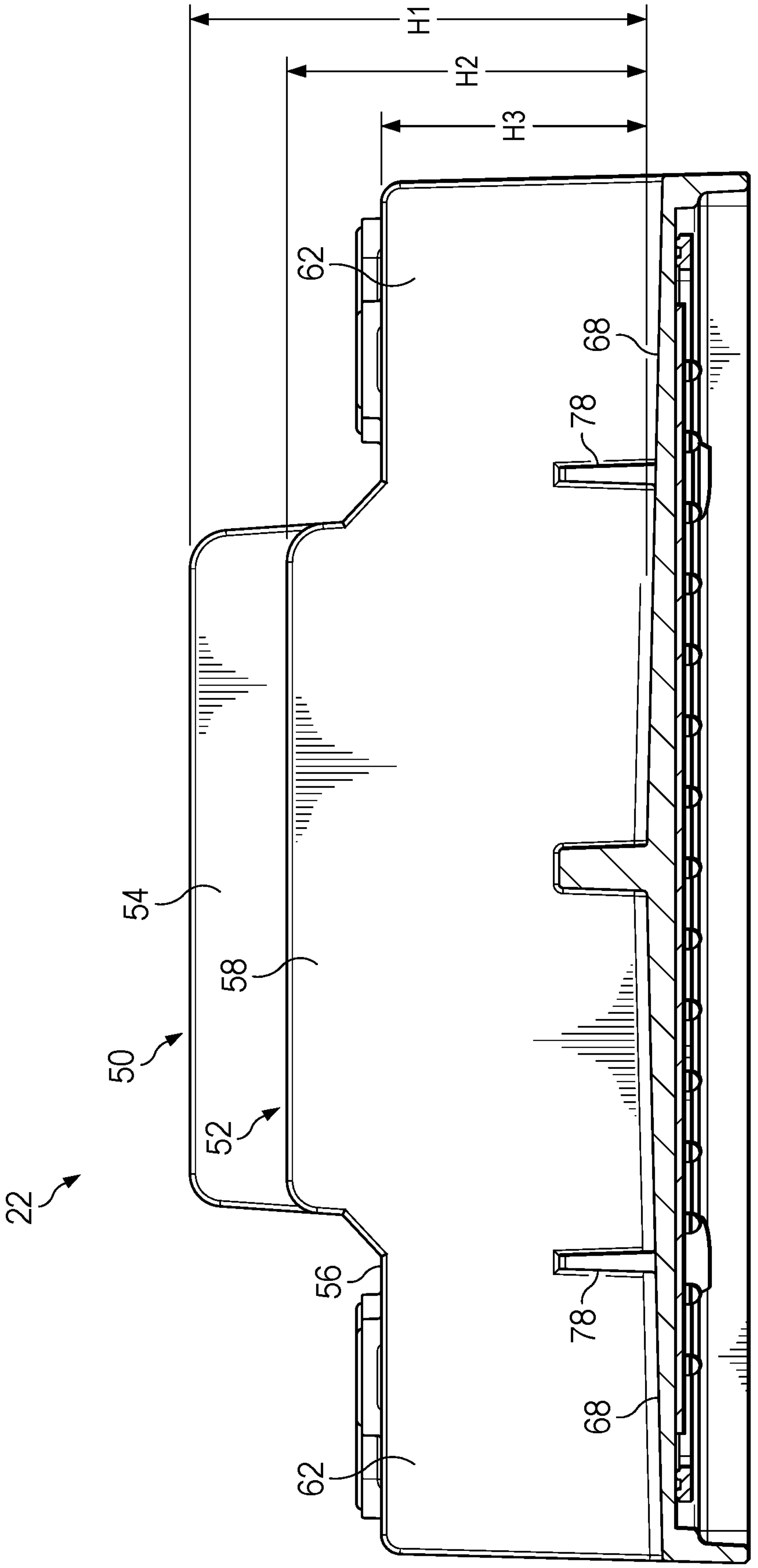
FIG. 6 is a sectional view taken along the line 6-6 in FIG. 1.

Referring now to FIG. 6, one of the first base fins 50 and the second base fins 52 will now be described but can be understood to be representative of the other first base fins 50 and second base fins 52, respectively. The central portion 54 of the first base fin 50 can have a height H1, the central portion 58 of the second base fin 52 can have a height H2, and the outer portions 56, 62 can have a height H3. The central portion 54 of the first base fin 50 can be taller than the central portion 58 of the second base fin 52 such that the height H1 of the central portion 54 is greater than the height H2 of the central portion 58 (both heights H1 and H2 being measured relative to the base plate 44). In one embodiment, the ratio of the height H1 to the height H2 can be between about 1.2:1 and about 1.4:1. In one embodiment, the height H1 can be between about 130 mm and 150 mm and the height H2 can be between about 110 mm and about 130 mm. Each of the central portion 54 of the first base fin 50 and the central portion 58 of the second base fin 52 can be taller than the outer portions 56, 62 such that the height H1 of the central portion 54 and the height H2 of the central portion 58 are greater than the height H3 of the outer portions 56, 62. The heights H3 of the outer portions 56, 62 can be substantially the same.

Figure 7:
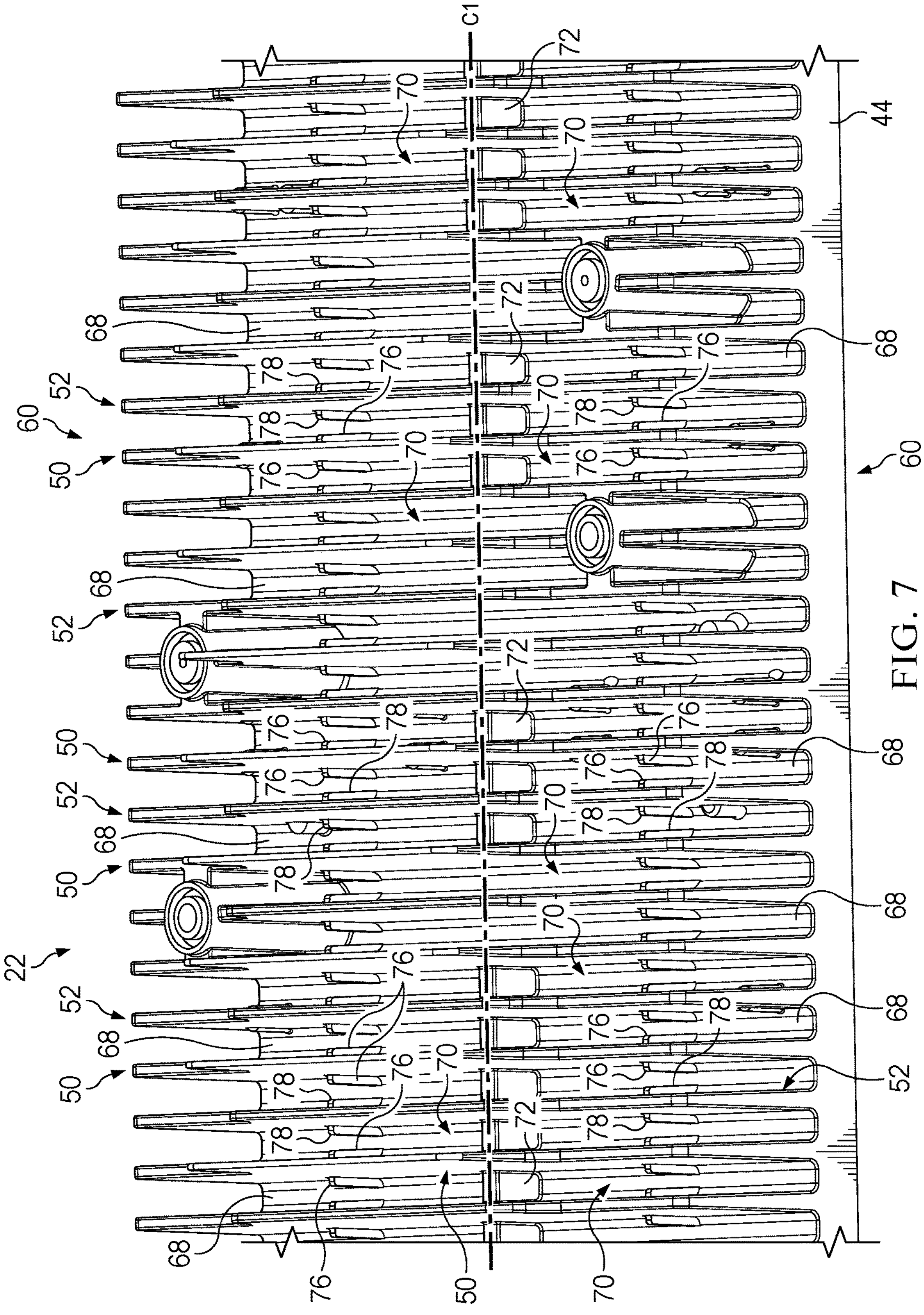
FIG. 7 is an enlarged isometric view of the heat sink of FIG. 4.

Referring now to FIG. 7, the heat sink 22 can define a centerline C1 that extends along a longitudinal center (e.g., a physical center) of the heat sink 22. The base plate 44 can include a plurality of upper surfaces 68 that each extend between respective ones of the first and second base fins 50, 52. As illustrated in FIG. 6, each of the upper surfaces 68 can slope downwardly from the middle of the heat sink 22 (e.g., at or vertically adjacent to the centerline C1) towards the opposing sides 60 of the heat sink 22 (e.g., to a perimeter R shown in FIG. 4). Referring again to FIG. 7, each upper surface 68 can cooperate with adjacent ones of the first and second base fins 50, 52 to define a channel 70 that can facilitate shedding of fluid (e.g., water) from the heat sink 22. In particular, when fluid is introduced between the first and second base fins 50, 52 (e.g., during irrigation of underlying plants), the upper surfaces 68 can encourage the fluid to flow towards the opposing sides 60 and off of the heat sink 22 to prevent fluid from collecting on the heat sink 22. The heat sink 22 can include a plurality of central rib members 72 in the middle of the heat sink 22 (e.g., at or vertically adjacent to the centerline C1) and/or at the peak of the upper surfaces 68 and can extend upwardly from the upper surfaces 68 and between respective ones of the first and second base fins 50, 52. The central rib members 72 can separate adjacent channels 70 from one another to prevent pooling of fluid at the peak of the upper surfaces 68 thereby further enhancing the shedding of fluid from the heat sink 22.

Figure 8:
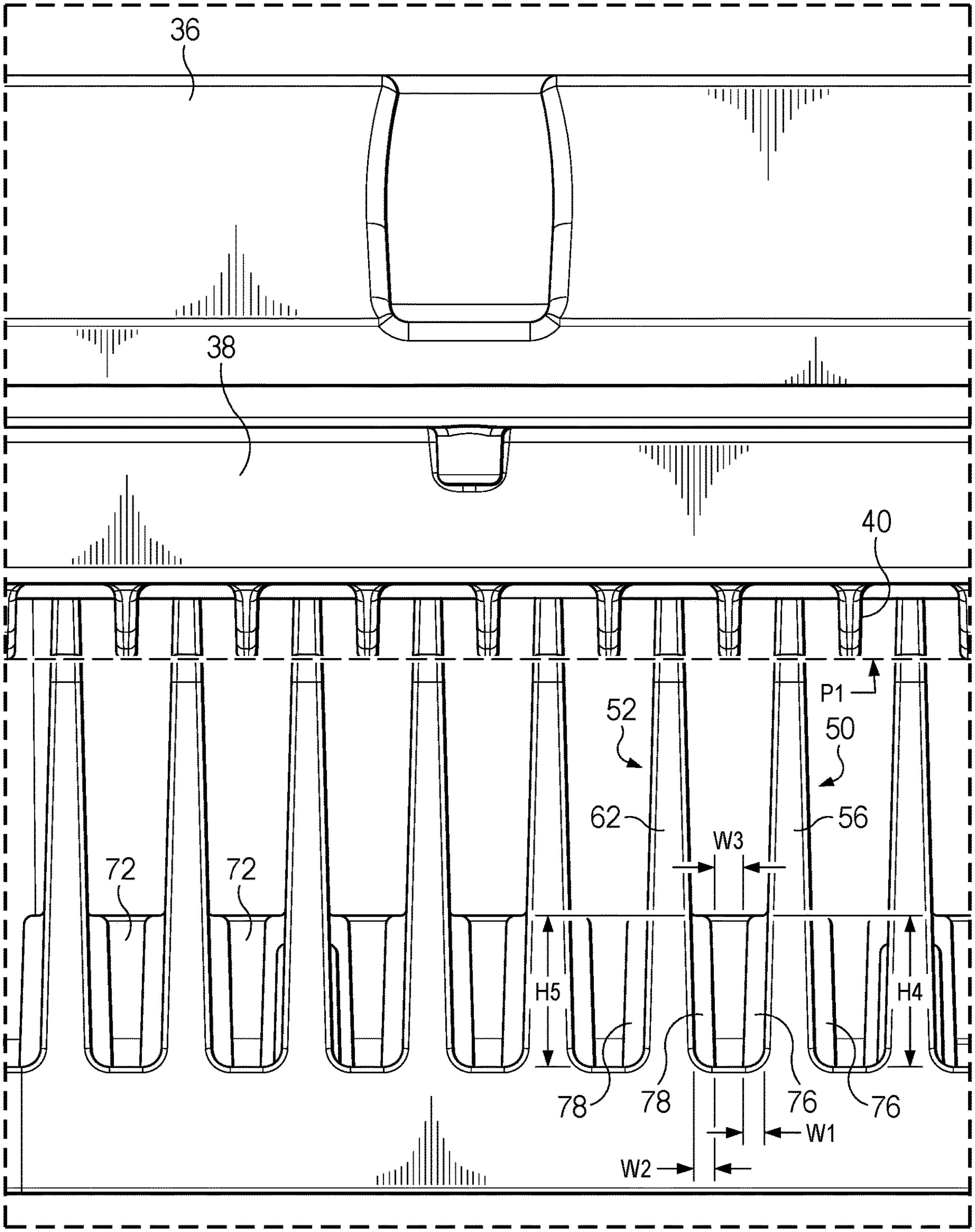
FIG. 8 is an enlarged view of the encircled portion of FIG. 5.

Referring now to FIGS. 7 and 8, the heat sink 22 can include first supplemental fins 76 that are disposed on opposite sides of the outer portions 56 of the first base fins 50 and second supplemental fins 78 that are disposed on opposite sides of the outer portions 62 of the second base fins 52. Each of the first and second supplemental fins 76, 78 can extend upwardly from the upper surfaces 68 and orthogonally from (e.g., at a right angle) the outer portions 56, 62 of the first and second base fins 50, 52, respectively, such that the first and second supplemental fins 76, 78 extend into the channels 70. Each first supplemental fin 76 can be arranged adjacent to one of the second supplemental fins 78. In one embodiment, each immediately adjacent first and second supplemental fins 76, 78 can be vertically aligned with each other.

Referring now to FIG. 8, one set of immediately adjacent first and second supplemental fins 76, 78 will now be described but can be understood to be representative of other sets of immediately adjacent first and second supplemental fins 76, 78. The first supplemental fin 76 can have a height H4 and the second supplemental fin 78 can have a height H5. The first supplemental fin 76 can be shorter than the outer portion 56 of the first base fin 50 such that the height H4 of the first supplemental fin 76 is less than the height H3 of the outer portion 56 (both heights H3 and H4 being measured relative to the upper surface 68). The second supplemental fin 78 can be shorter than the outer portion 62 of the second base fin 52 such that the height H5 of the second supplemental fin 78 is less than the height H3 of the outer portion 62. In one embodiment, the heights H4 and H5 can be substantially the same. In one embodiment, the ratio of the height H3 to the height H4 and the ratio of the height H3 to the height H5 can both be about 3:1.

The first and second supplemental fins 76, 78 can be horizontally spaced from each other such that the channel 70 can extend between the first and second supplemental fins 76, 78 to allow for fluid to pass therebetween when being shed from the heat sink 22. The first supplemental fin 76 can have a width W1 measured relative to the first base fin 50 and the second supplemental fin 78 can have a width W2 measured relative to the second base fin 52. The first and second supplemental fins 76, 78 can be laterally spaced from each other by a width W3. The width of the lateral spacing between the first supplemental fin 76 and the second supplemental fin 78 (e.g., D3) can be wider than the width W1, W2 of either of the first supplemental fin 76 or the second supplemental fin 78, respectively.

The first and second supplemental fins 76, 78 can enhance the heat dissipation properties of the heat sink 22 without increasing its form factor and without obstructing the channels 70. The heat sink 22 can accordingly perform better than conventional heat sink arrangements while also being capable of being properly powder coated (without having excessive internal discharge between the first and second supplemental fins 76, 78 that would otherwise repel the powder coating).

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A light fixture comprising:
- a lighting module comprising a plurality of light emitting diodes that are configured to project light onto an area beneath the light fixture; and
- a heat sink overlying the lighting module and configured to dissipate heat away from the lighting module, the heat sink comprising:
  - a base plate;
  - a first base fin extending upwardly from the base plate;
  - a second base fin extending upwardly from the base plate and spaced from the first base fin;
  - a first supplemental fin extending laterally from the first base fin towards the second base fin; and
  - a second supplemental fin extending laterally from the second base fin towards the first base fin and spaced from the first supplemental fin, wherein each of the first supplemental fin and the second supplemental fin extend upwardly from the base plate.

2. The light fixture of claim 1 wherein:
- the first base fin has a first height at the first supplemental fin;
- the second base fin has a second height at the second supplemental fin;
- the first supplemental fin has a third height that is less than the first height; and
- the second supplemental fin has a fourth height that is less than the second height.

3. The light fixture of claim 2 wherein a ratio of the third height to the first height and of the fourth height to the second height is about 1:3.

4. The light fixture of claim 1 wherein:
- the first supplemental fin has a first width;
- the second supplemental fin has a second width; and
- the first supplemental fin and the second supplemental fin can be spaced from each other by a third width that is greater than each of the first width and the second width.

5. The light fixture of claim 1 wherein:
- the base plate includes an upper surface that extends between the first base fin and the second base fin;
- the upper surface, the first base fin, and the second base fin cooperate to define a channel; and
- the first supplemental fin and the second supplemental fin extend into the channel.

6. The light fixture of claim 5 wherein the upper surface slopes downwardly towards an outer perimeter of the heat sink.

7. The light fixture of claim 1 wherein the heat sink is formed of a unitary one-piece construction.

8. A light fixture comprising:
- a lighting module comprising a plurality of light emitting diodes that are configured to project light onto an area beneath the light fixture;
- a heat sink overlying the lighting module and configured to dissipate heat away from the lighting module, the heat sink comprising:
  - a base plate; and
  - a plurality of base fins extending upwardly from the base plate, each base fin of the plurality of base fins being interposed between and spaced from each other; and
- a driver housing overlying the heat sink and configured to house a driver, the driver housing comprising:
  - a lid;
  - a base; and
  - a plurality of lower fins configured to dissipate heat away from the driver, the plurality of lower fins extending downwardly from the base and towards the base plate, wherein each lower fin of the plurality of lower fins is interposed between and spaced from a pair of base fins of the plurality of base fins such that the plurality of the lower fins and the plurality of base fins are intersected by an imaginary plane.

9. The light fixture of claim 8 wherein:
- each base fin of the plurality of base fins comprises a central portion and an outer portion that extends laterally from the central portion towards one side of the heat sink;
- the outer portion is shorter than the central portion; and
- the outer portions and the central portions of the plurality of base fins cooperate to define a contoured groove on one side of the heat sink for accommodating the driver housing.

10. The light fixture of claim 8 wherein the heat sink is formed of a unitary one-piece construction.

11. A light fixture comprising:

a lighting module comprising a plurality of light emitting diodes that are configured to project light onto an area beneath the light fixture; and a heat sink overlying the lighting module and configured to dissipate heat away from the lighting module, the heat sink comprising:

a base plate;

a first base fin extending upwardly from the base plate;

a second base fin extending upwardly from the base plate and spaced from the first base fin;

a first supplemental fin extending from the first base fin towards the second base fin; and a second supplemental fin extending from the second base fin towards the first base fin and spaced from the first supplemental fin;

a driver housing overlying the heat sink and comprising:

a lid;

a base; and a lower fin extending downwardly from the base and towards the base plate, wherein the lower fin is interposed between and spaced from the first base fin and the second base fin such that the lower fin, the first base fin and the second base fin are intersected by an imaginary plane.

12. The light fixture of claim 11 wherein each of the first supplemental fin and the second supplemental fin extend upwardly from the base plate.

13. The light fixture of claim 11 wherein the first supplemental fin extends orthogonally from the first base fin and the second supplemental fin extends orthogonally from the second base fin.

14. The light fixture of claim 11 wherein:

the first base fin has a first height at the first supplemental fin;

the second base fin has a second height at the second supplemental fin;

the first supplemental fin has a third height that is less than the first height; and the second supplemental fin has a fourth height that is less than the second height.

15. The light fixture of claim 14 wherein a ratio of the third height to the first height and of the fourth height to the second height is about 1:3.

16. The light fixture of claim 11 wherein:

the first supplemental fin has a first width;

the second supplemental fin has a second width; and the first supplemental fin and the second supplemental fin can be spaced from each other by a third width that is greater than each of the first width and the second width.

17. The light fixture of claim 11 wherein:

the base plate includes an upper surface that extends between the first base fin and the second base fin; and the upper surface slopes downwardly towards an outer perimeter of the heat sink.

18. The light fixture of claim 11 wherein:

each base fin of the plurality of base fins comprises a central portion and an outer portion that extends laterally from the central portion towards one side of the heat sink;

the outer portion is shorter than the central portion; and the outer portions and the central portions of the plurality of base fins cooperate to define a contoured groove on one side of the heat sink for accommodating the driver housing.

19. The light fixture of claim 11 wherein the heat sink is formed of a unitary one-piece construction.

* * * * *